No. 757,324. PATENTED APR. 12, 1904.
G. G. LITTLE.
SAFETY ATTACHMENT FOR ELEVATORS.
APPLICATION FILED JUNE 2, 1903.
NO MODEL. 2 SHEETS—SHEET 1.
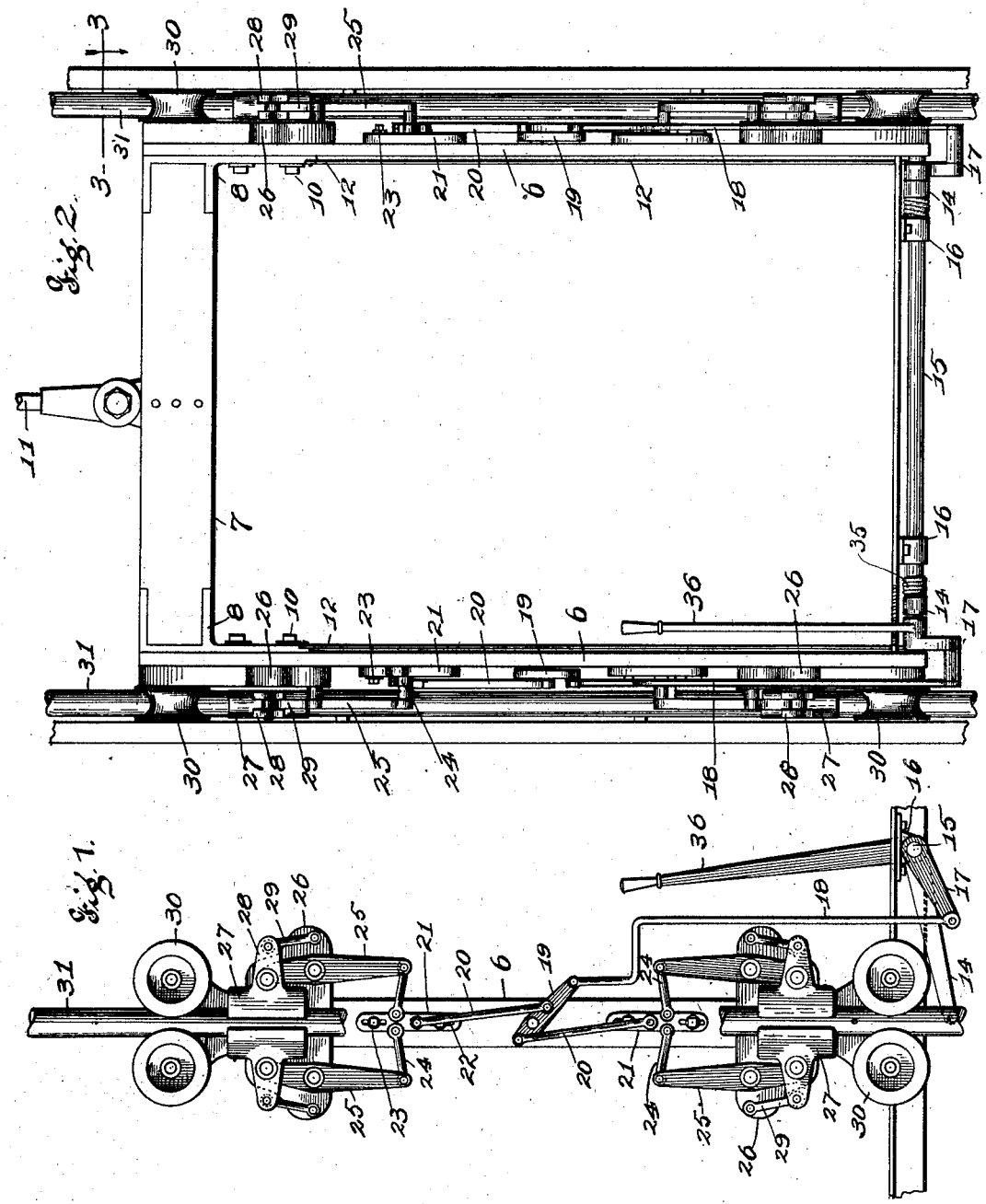

No. 757,324. PATENTED APR. 12, 1904.
G. G. LITTLE.
SAFETY ATTACHMENT FOR ELEVATORS.
APPLICATION FILED JUNE 2, 1903.
NO MODEL. 2 SHEETS—SHEET 2.
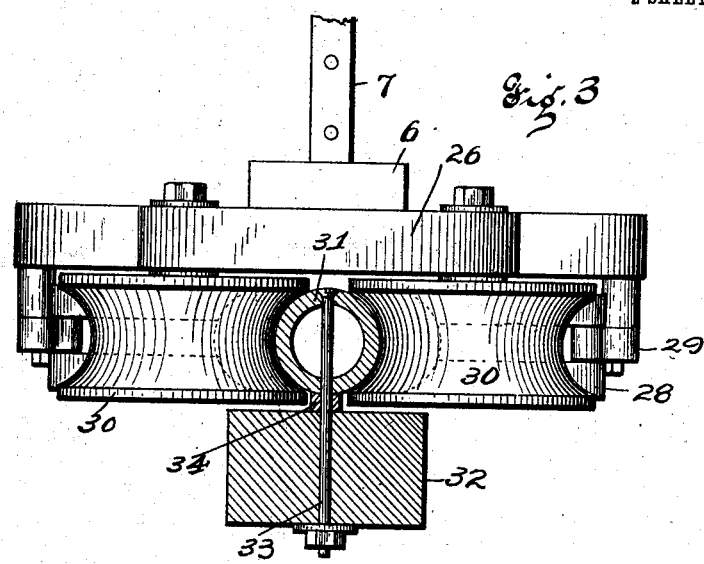
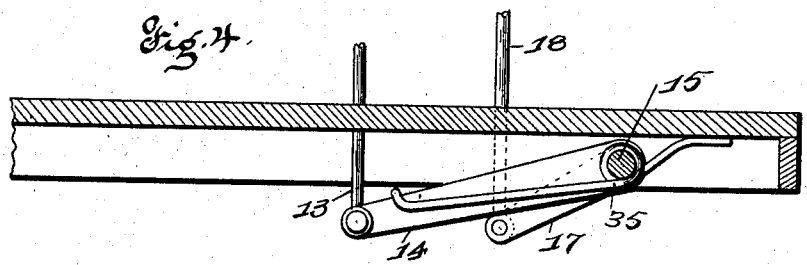
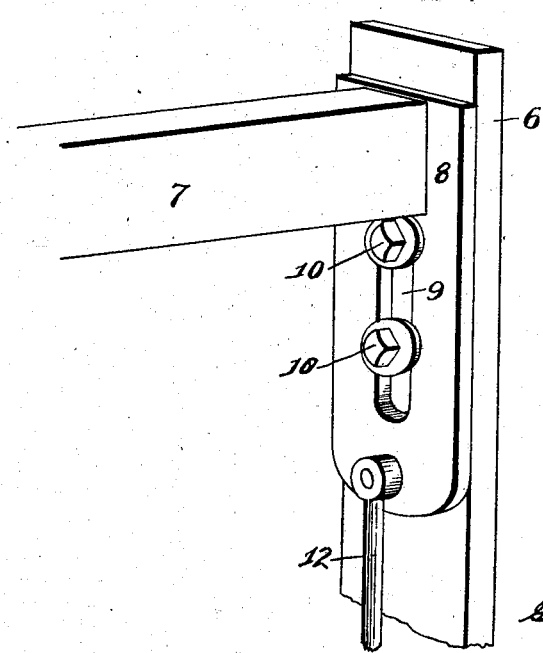

No. 757,324. Patented April 12, 1904.

UNITED STATES PATENT OFFICE.

GEORGE G. LITTLE, OF ST. LOUIS, MISSOURI.

SAFETY ATTACHMENT FOR ELEVATORS.

SPECIFICATION forming part of Letters Patent No. 757,324, dated April 12, 1904.

Application filed June 2, 1903. Serial No. 159,795. (No model.)

*To all whom it may concern:*

Be it known that I, GEORGE G. LITTLE, a citizen of the United States, residing at St. Louis, State of Missouri, have invented certain new and useful Improvements in Safety Attachments for Elevators, of which the following is a specification containing a full, clear, and exact description, reference being had to the accompanying drawings, forming a part hereof.

My invention relates to a safety attachment for elevators; and it consists in the novel construction, combination, and arrangement of parts, as will be fully hereinafter described and claimed.

The object of my invention is to construct a device to be attached to the elevator-cage to prevent said cage from falling in the event of the breaking of the cable.

A further object of my invention is that should the cable break while the cage is suspended within the shaft the mechanism will automatically grip the guide-tubes and stop said cage.

A further object of my invention is that the operator by means of operating a lever within the cage can allow said cage to descend gradually to the bottom of the shaft after the gripping device has locked said cage in the shaft after the breaking of the cable.

Figure 1 is a side view of my complete device with a part of the guide-tube broken away, clearly illustrating the construction. Fig. 2 is a front view of the same. Fig. 3 is a horizontal sectional view taken on the line 3 3 of Fig. 2 viewing it in the direction indicated by the arrow. Fig. 4 is a detail sectional view of the cage-bottom, showing the arrangement of the arms and spring made use of in automatically operating the clutches. Fig. 5 is a detail perspective view of the upper construction of the cage-frame.

In the construction of my invention I provide the cage with vertical members 6. To the upper portion thereof is slidably secured the cross-timber 7, the ends thereof being mounted in castings 8, which extend downwardly at right angles to said timber and are provided with an elongated slot 9, through which bolts 10 are passed and securely held in the vertical members 6, the purpose of which is to allow the timber 7 to rise and fall, depending upon the tension of the cable 11.

To the lower ends of the castings 8 is secured one end of the rods 12, the other end, 13, being secured to the free ends of the arms 14. Said arms 14 are mounted upon and operated by the horizontal shaft 15, which extends across the entire width of the cage and located beneath the cage-bottom and supported in suitable bearings 16. Upon said shaft are also provided the short arms 17, to the free ends of which are secured the vertical clutch-operating rods 18.

Upon the vertical members 6 and arranged about the center are fulcrums 19, to which are pivoted connecting-rods 20, and to the end of the long portion of the fulcrum is pivoted one end of the operating-rod 18. One end of the connecting-rods 20 is pivotally secured to guide-plates 21, provided with elongated slots 22 and held against the vertical members 6 by the bolts 23. To the guide-plates 21 are pivotally secured the toggles 24, which are connected to and operate the clamping-arms 25. The clamping-arms 25 are pivotally mounted upon castings 26 and are connected to and operate the clamping jaws or shoes 27. The clamping-jaws are provided with projecting ears 28, to which the short rods 29 are secured, and are for the purpose of retaining the jaws in a horizontal position during the movement thereof caused by the action of the operating mechanism. The short rods 29 are also pivotally connected to the castings 26.

The outer ends of the castings 26 are provided with guide-rollers 30 and are so arranged as to freely revolve upon the vertical guide tube or rod 31, which is constructed to extend the entire depth of the elevator-shaft. The guide tube or rod 31 is rigidly held to timbers 32 by means of the bolts 33 and is held a short distance from the surface of the timbers 32 by means of the collars or washers 34, this construction being for the purpose of allowing the flanges of the rollers 30 to pass between the same and will assume the position as indicated in Fig. 3.

Upon the shaft 15 is located the spring 35, the one end thereof engaging with the upper surface of the arms 14 and the other end of said spring resting against the bottom of the cage. The purpose of said spring is to press downwardly upon the arms 14 and is of sufficient tension to draw the upper frame of the cage downwardly should the cable break, thereby automatically operating the clutching mechanism, and thereby stopping the cage instantly. Should the cage be stopped in the shaft between two floors, the operator can then gradually lower the same by manipulating the hand-lever 36, which is connected to the shaft 15, and can in this manner allow the cage to descend gradually to the bottom of the shaft.

The operation of my invention is as follows: Should the cable 11 break while the cage is at any point within the shaft, the weight of the cage and passengers therein will be released from the tension of the cable and by means of the springs 35 will draw downwardly upon the arms 14, operating the shaft 15 and in turn operating the short arms 17, imparting power to the operating-rod 18, which will operate the toggle mechanism, thereby forcing the clamping-jaws against the guide-tube, and in this manner will automatically stop the cage within the shaft. By the use of the hand-lever 36 the operator may more firmly put on the clamping device or release the same to gradually descend, thus saving life and the destruction of the mechanism and such articles as may be carried upon the elevator-cage.

Having fully described my invention, what I claim is—

1. A safety device for elevators, comprising a frame, guide-tubes located at the sides of the elevator-shaft extending throughout its depth, a plurality of clutches carried by said frame and arranged to be brought in contact with the guide-tubes, said clutches having semicircular contact-surfaces, arms and toggles carried by said frame for operating said clutches, and a lever operating said arms and toggles whereby the clutches may be applied or released, substantially as specified.

2. A safety device for elevators, comprising vertical guide-tubes secured to the sides of the elevator-shaft, a clutching mechanism, a plurality of arms and toggles operating said clutching mechanism, vertical rods located within said frame attached to the upper member of the elevator-frame, said rods automatically placing the clutching mechanism in operation at the instant the cage should release itself from the cable, substantially as specified.

3. A safety device for elevators, comprising guide-tubes located within the elevator-shaft, an elevator-cage, arms and toggles carried by and located on two sides of said elevator-cage, guide-plates controlling the movement of the toggles and arms, fulcrums manipulating the guide-plates, clutching-shoes having semicircular contact-surfaces engaging with the guide-tubes, and a means for placing the several parts in operation at the instant the cage should release itself from the cable, substantially as specified.

4. A device of the class described, comprising a clutching mechanism carried by the elevator-cage, guide-tubes located in the elevator-shaft, clamping-jaws arranged to come in contact with said guide-tubes, a plurality of toggles and levers connected to guide-plates secured to the sides of the cage, rods and arms arranged to operate said levers and toggles for throwing the said clamping-jaws in contact with the guide-tubes, in the event of accident, guide-rollers carried by said cage and engaging with the guide-tubes to retain said cage in erect position, a means for allowing the cross-timber of the cage to slide a short distance downwardly when released of the cable, automatically allowing the mechanism to be placed in operation and stopping the cage within the shaft almost instantly, and a hand-lever whereby the said mechanism may be released and the cage allowed to gradually descend the shaft, substantially as specified.

In testimony whereof I have signed my name to this specification in presence of two subscribing witnesses.

GEORGE G. LITTLE.

Witnesses:
 ALFRED A. EICKS,
 M. G. IRION.